United States Patent
Jackson et al.

(10) Patent No.: US 6,190,467 B1
(45) Date of Patent: Feb. 20, 2001

(54) REPAIR ALLOY COMPOSITIONS

(75) Inventors: Melvin Robert Jackson, Niskayuna, NY (US); Stephen Joseph Ferrigno, Cincinnati; David Edwin Budinger, Milford, both of OH (US); Richard Patrick Chesnes, Zionsville, IN (US)

(73) Assignee: General Electric Company, Schenectady, NY (US)

(*) Notice: Under 35 U.S.C. 154(b), the term of this patent shall be extended for 0 days.

(21) Appl. No.: 09/327,001

(22) Filed: Jun. 7, 1999

Related U.S. Application Data

(62) Division of application No. 08/927,138, filed on Sep. 2, 1997, now Pat. No. 6,027,584.

(51) Int. Cl.[7] ................................................. C22C 19/03
(52) U.S. Cl. ........................... 148/426; 420/441; 420/449
(58) Field of Search ............................ 148/426; 420/441, 420/449

(56) References Cited

U.S. PATENT DOCUMENTS

| | | | |
|---|---|---|---|
| 4,900,638 | * | 2/1990 | Emmerich ............................ 428/606 |
| 5,759,300 | * | 6/1998 | Hasegawa et al. ................... 148/304 |

* cited by examiner

*Primary Examiner*—John Sheehan
(74) *Attorney, Agent, or Firm*—Robert P. Santandrea; Noreen C. Johnson

(57) ABSTRACT

A Ni-base alloy composition comprises of Zr, B, and Si. Zr and B are coupled to each other to form $ZrB_2$, the B and Zr suppress melting points of the Ni-base alloy composition. Further, a Ni-base alloy composition also comprises Cr, Ti, and Ni, where the Ti and Cr suppress melting points.

15 Claims, 2 Drawing Sheets

REPAIR ALLOY COMPOSITIONS

This application is a division of application Ser. No. 09/2927,138, filed Sep. 2, 1997, now U.S. Pat. No. 6,027,584 which is hereby incorporated by reference in its entirety.

FIELD OF THE INVENTION

The invention relates to repair alloy compositions. The repair alloy compositions provide a low melting point composition, and are desirable for use in braze repair applications, especially for the repair of engine and gas turbine components.

BACKGROUND OF THE INVENTION

Cracks, damaged areas and other similar defects in jet engine and gas turbine components, such as but not limited to turbine buckets, blades and vanes, are of course extremely undesirable and dangerous if larger than permitted by design practice and standards. The cracks, damaged areas and other similar defects are formed during service, and are due, in part, to effects of one or more of mechanical fatigue, thermal fatigue, creep rupture, and foreign object damage. Additionally, significant metal loss can occur by oxidation or corrosion in an engine's environment.

The cracks, damaged areas and other similar defects can be localized in an area of an engine component. The remainder of the area of an engine component may be subjected to less severe stress and thermal environments, however these would not jeopardize performance of the engine component for many hours of continued service. In this situation, the repair of the engine component may have a significant economic savings and value. The repair of the engine component need not necessarily be to original performance levels, but need only be to a predetermined acceptable level of those original performance levels.

Currently, in order to repair engine components, damaged areas of the engine components are treated to clean any oxide from both external airfoil surfaces and internal faces. Then any cracks, damaged areas, and other such defects are filled in with powder mixes, which are at least partially melted in a repair braze thermal cycle. The powder mixes include at least one low-melting powder composition, where the powder mixes will melt and flow, for example by capillary action. Thus, melted flowing powder mixes will fill deep cracks, carrying some higher-melting, still-solid, powders along with the flowing melt.

During the repair cycle, at least a partial dissolution of the higher-melting powders and substrate surfaces occurs. The partially dissolutionized higher-melting powders and substrate surfaces will flow into the lower-melting liquid. This flow will continue until the liquid composition is altered, thus a melting range of the diluted melted liquid composition is increased, and freezing of the liquid composition occurs.

The engine components often are formed from a composition comprising a Ni-base alloy composition. Accordingly, to achieve a satisfactory flow in a low-melting alloy, various amounts of melting point depressants, such as Si and B, are commonly used in a Ni-base braze repair alloy composition. These levels of melting point depressants can reach levels up to about 6 atomic percent (a/o) Si and greater than about 12 a/o B. These levels of melting point depressants, such as Si and B, insure wetting of the solid surfaces of the engine components, and significantly reduce a melting range of the Ni-base braze repair alloy composition, which contains the Si and B as melting point depressants.

However, these melting point depressant levels, such as Si and B, make repeated repair procedures risky, because large portions of multiply repaired airfoils are often subject to melting in hot streak transients. The hot streak transients often occur in engine components during use. These levels of melting point depressants, such as Si and B, can also lead to a decreased rupture life, since rupture is effected by the proximity of a service temperature to an incipient melting range, for the compositions of the alloys in the engine component and the repair alloy composition.

Further, both B and Si constituents in a Ni-base braze repair alloy composition can lead to large fractions of the repaired engine component regions being converted to undesirable and often detrimental brittle intermetallics and intermediate phases. The brittle intermetallics and intermediate phases also comprise undesirable silicides and borides, which also are detrimental to engine components, especially when repaired.

SUMMARY OF THE INVENTION

Accordingly, it is desirable to provide a Ni-base braze repair alloy compositions that overcome the above noted, and other deficiencies.

Therefore, it is desirable to provide a Ni-base alloy composition, for braze repair comprising: Zr, B and a balance Ni, where Zr and B are coupled to each other to form $ZrB_2$. B and Zr suppress melting points of the Ni-base braze repair alloy composition.

DETAILED DESCRIPTION OF THE EMBODIMENTS

Figure 1:
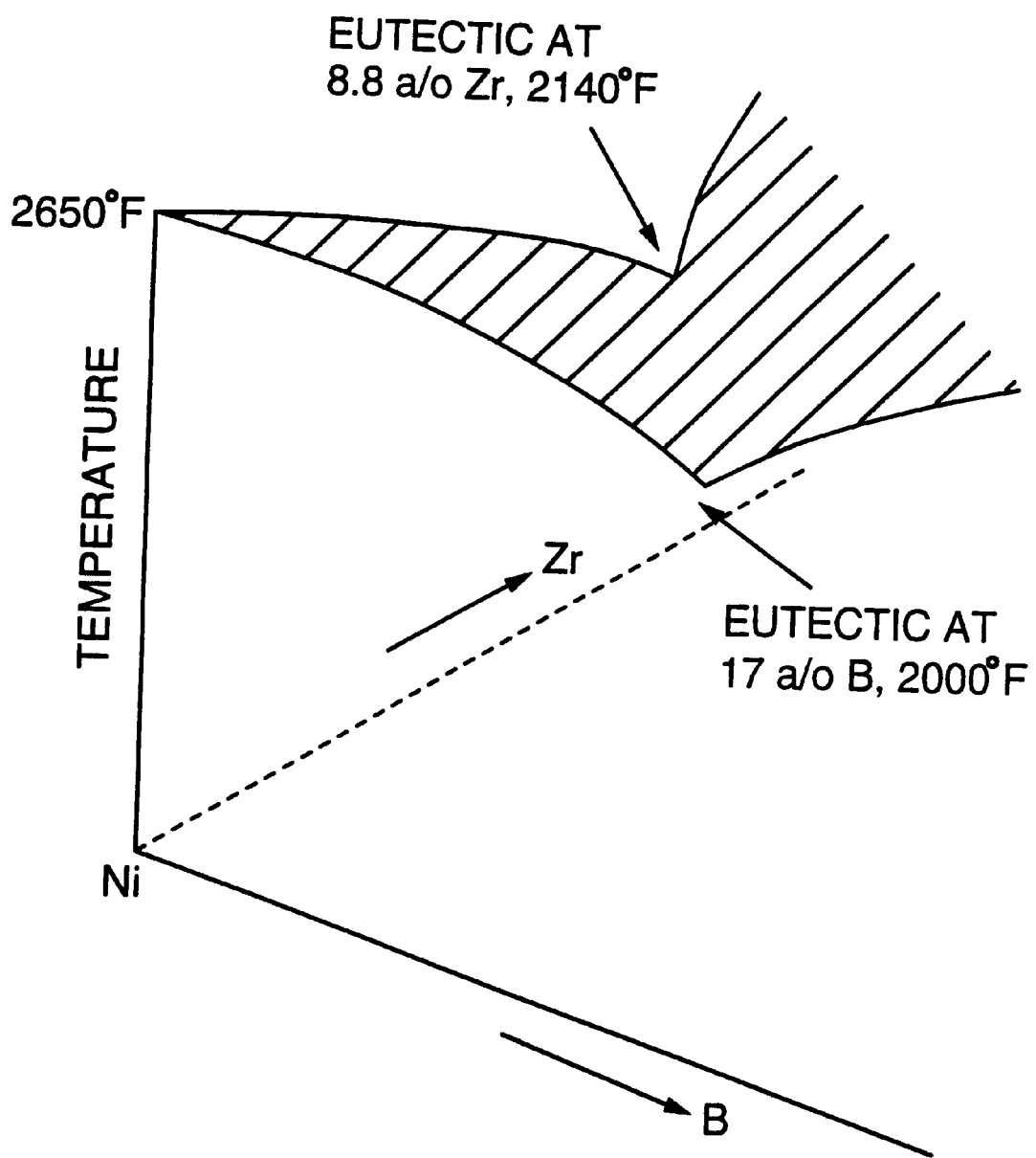
FIG. 1 is a schematic illustration of a portion of a NiZrB phase diagram at the Ni-rich region of the NiZrB system.

To adequately repair engine components, it is desirable to provide a repair alloy composition that approximates the strength of the alloy used to form the engine component itself. This, of course, will provide a strength-wise alloy having an approximately equal strength gradient from the repair portion to the original engine component portion. Whereas, a Ni-base alloy is common for engine component constructions for its well-known beneficial characteristics, it is desirable to provide a Ni-base braze repair alloy composition. The Ni-base braze repair alloy composition will produce, and result in, a substance that is as strong a repaired region as possible.

Ni-base braze repair alloy composition will produce and result in a substance that is almost as strong as the substrate being repaired. Therefore, Ni-base braze repair alloy composition for the repaired regions should contain superalloy strengtheners. The superalloy strengtheners in the Ni-base braze repair alloy composition comprise superalloy strengtheners, such as, but not limited to at least one of Al, W, Mo, Re, Ta and Nb.

Table I lists compositions of several single crystal (SC) and directionally solidified (DS) superalloy compositions (A, B and C), in atomic percent. These alloy have a Ni-base braze repair alloy composition and comprise at least the listed constituents, with the balance being Ni. Table I also lists alloy D, which contains Zr and B, which is Ni-base braze repair alloy composition. Further, Table 1 also lists composition A1, as one Ni-base braze repair alloy composition, as embodied by the invention.

Ideally, a Ni-base braze repair alloy composition, as embodied by the invention, will approach a repair alloy composition approximating a "repair alloy goal" composition. A "repair alloy goal" composition, such as composition A1 is listed in Table I. Since the "repair alloy goal" composition provides a Ni-base braze repair alloy composition that is almost as strong as the substrate being repaired, a Ni-base braze repair alloy composition that is close to the "repair alloy goal" composition is desirable.

Further, a Ni-base braze repair alloy composition that approximates the "repair alloy goal" composition, when provided in a single powder composition, avoids undesirable inhomogeneities, which are inherent in mixtures of two or more powders. Also, a Ni-base braze repair alloy composition that approximates the "repair alloy goal" composition would be useful in a repair of very wide cracks, where high B and Si concentrations lead to undesirable ductility and toughness characteristics in the repair area of the engine component.

Further beneficial results in a Ni-base braze repair alloy composition, as embodied by the invention, are achieved by providing a high-melting portion of a mix heavily concentrated with strengthening elements, such as but not limited to at least one of Al, W, Mo, Re, Ta and Nb. Also, other of the numerous beneficial results in a Ni-base braze repair alloy composition, as embodied in the invention, are achieved by providing lower-melting temperature components with low concentrations of melting point depressants, such as but not limited to Si and B.

Ni-base braze repair alloy composition, as embodied in the invention, comprise constituents, such as but not limited to at least B and Zr, in order to improve single-chemistry repair alloys compositions that avoid inherent disadvantages associated with mixed two-chemistry repair alloy powders. Further, strengthening elements, which comprise at least one strengthening element selected from the group consisting of, but not limited to at least one of Al, W, Mo, Re, Ta and Nb, are also added to the Ni-base braze repair alloy composition, as embodied in the invention.

The strengthening element or strengthening elements, as discussed above, are added to the Ni-base braze repair alloy composition to provide strengthening element additions similar to the alloys being repaired. Also, a Ni-base braze repair alloy composition, as embodied by the invention, is also produced with a low melting range for braze repair applications.

The Ni-base braze repair alloy composition, as embodied by the invention, is suitable for a single-chemistry Ni-base braze repair alloy composition. The single-chemistry Ni-base braze repair alloy composition, as embodied by the invention, also avoids difficulties inherent in mixed powders that are used for alloy repair. Additionally, these Ni-base braze repair alloy compositions also are useful as a low-melting constituent in Ni-base braze repair alloy compositions, if powder blends are still desired, or as is some instances required.

The Ni-base braze repair alloy compositions, as embodied in the invention, are listed in Table II by atomic percent (a/o) and in Table III by weight percent (w/o). Table II also lists estimates of first melting temperatures and full melting temperatures. The estimates of first melting temperatures and full melting temperatures for the Ni-base braze repair alloy compositions are derived from differential thermal analyses of Ni-base braze repair alloy compositions. These estimates of first melting temperatures and full melting temperatures are approximations, however they provide an indication of trends in liquidus and solidus, as a function of temperature.

TABLE I

| a/o | Alloy A | Alloy B | Alloy C | Alloy Goal | Repair Alloy D |
|---|---|---|---|---|---|
| Al | 9.3 | 13.8 | 13.7 | 12/14 | 12 |
| Cr | 11.1 | 8.1 | 7.9 | 8/9 | 8 |
| Co | 7.5 | 7.6 | 12.3 | 8 | 8 |
| Ta | 1.6 | 2.3 | 2.1 | 2 | — |
| B | 0.03 | 0.03 | 0.1 | <8 | 6 |
| Mo | 0.9 | 0.9 | 0.9 | 0.7 | — |
| W | 2.0 | 1.6 | 1.6 | 0.8 | — |
| Re | — | 1.0 | 0.9 | 0.5 | — |
| C | 0.2 | 0.2 | 0.6 | 0.2 | — |
| Hf | 0.07 | 0.06 | 0.5 | — | — |
| Other | 0.3 Nb 4.3 Ti | 0.01Y | — | — | 3.0 Zr |

TABLE II

Ni-BASE BRAZE REPAIR ALLOY COMPOSITIONS (a/o)

| | | | | | | | | | | | | | Temperatures in °F. | | |
|---|---|---|---|---|---|---|---|---|---|---|---|---|---|---|---|
| Alloy (a/o) | Ni | Ti | Cr | Co | B | Si | Al | Zr | Ta | Mo | W | Re other | solidus | liquidus | delta |
| A1 | 63 | | 8 | 8 | 6 | | 12 | 3 | | | | | na | na | na |
| A2 | 60 | | 5 | 10 | 6 | 1 | 15 | 3 | | | | | 1906 | 2274 | 368 |
| A3 | 61 | | 8 | 8 | 6.5 | 1.5 | 12 | 3 | | | | | 1912 | 2265 | 353 |
| A4 | 60.5 | 1.5 | 8 | 8 | 6.5 | 1.5 | 12 | 2 | | | | | 1916 | 2243 | 327 |
| A5 | 60.5 | | 8 | 8 | 6.5 | 1.5 | 12 | 2 | 1.5 | | | | 1918 | 2269 | 351 |
| A6 | 57.5 | | 8 | 8 | 6.5 | 1.5 | 12 | 3 | | 1.5 | 1.5 | 0.5 | 1905 | 2272 | 367 |
| A7 | 57 | | 8 | 8 | 6.5 | 1.5 | 12 | 3 | 1.5 | 1 | 1 | 0.5 | na | na | na |
| A8 | 55 | 2.5 | 8 | 8 | 6.5 | 1.5 | 10 | 3 | 1.5 | 1 | 1 | 0.5 1.5 Nb | 1916 | 2260 | 344 |
| A9 | 60 | 2.5 | 8 | 8 | 3 | 1.5 | 10 | 1.5 | 1.5 | 1 | 1 | 0.5 1.5 Nb | 1997 | 2325 | 328 |
| A10 | 57.2 | 2.5 | 8 | 8 | 5 | 1.5 | 10 | 2.3 | 1.5 | 1 | 1 | 0.5 1.5 Nb | | | |

TABLE II-continued

Ni-BASE BRAZE REPAIR ALLOY COMPOSITIONS (a/o)

| Alloy (a/o) | Ni | Ti | Cr | Co | B | Si | Al | Zr | Ta | Mo | W | Re | other | solidus | liquidus | delta |
|---|---|---|---|---|---|---|---|---|---|---|---|---|---|---|---|---|
| A11 | 51.6 | 1.2 | 10.8 | 11.4 | 5.2 | 4 | 9.4 | 3.1 | 1.4 | 0.6 | 1 | | 0.3 Hf | | | |
| A12 | 50 | 1.2 | 10.6 | 11.2 | 7.6 | 3.9 | 9.2 | 3. | 1.4 | 0.6 | 1 | | 0.3 Hf | | | |

Temperatures in ° F.

TABLE III

Ni-BASE BRAZE REPAIR ALLOY COMPOSITIONS (w/o)

| Alloy (w/o) | Ni | Ti | Cr | Co | B | Si | Al | Zr | Ta | Mo | W | Re | other |
|---|---|---|---|---|---|---|---|---|---|---|---|---|---|
| A1 | 70.47 | | 7.93 | 8.98 | 1.24 | | 6.17 | 5.21 | | | | | |
| A2 | 68.49 | | 5.05 | 11.46 | 1.26 | .55 | 7.87 | 5.32 | | | | | |
| A3 | 69.16 | | 8.03 | 9.10 | 1.36 | .82 | 6.31 | 3.56 | | | | | |
| A4 | 69.24 | 1.40 | 8.11 | 9.19 | 1.37 | .82 | 6.31 | 3.56 | | | | | |
| A5 | 66.65 | | 7.81 | 8.85 | 1.32 | .79 | 6.08 | 3.42 | 5.08 | | | | |
| A6 | 61.54 | | 7.58 | 8.59 | 1.28 | .77 | 5.90 | 4.99 | | 2.62 | 5.03 | 1.70 | |
| A7 | 59.90 | | 7.45 | 8.44 | 1.26 | .75 | 5.80 | 4.90 | 4.85 | 1.72 | 3.29 | 1.64 | |
| A8 | 56.89 | 2.11 | 7.33 | 8.31 | 1.24 | 0.74 | 4.75 | 4.82 | 4.78 | 1.69 | 3.24 | 1.64 | 2.46 Nb |
| A9 | 60.79 | 2.07 | 7.18 | 8.14 | 0.56 | 0.73 | 4.66 | 2.36 | 4.68 | 1.66 | 3.17 | 1.60 | 2.40 Nb |
| A10 | 58.66 | 2.09 | 7.27 | 8.24 | .94 | .24 | 4.71 | 3.66 | 4.74 | 1.68 | 3.21 | 1.63 | 2.43 Nb |
| A11 | 54.0 | 1.0.0 | 10.0 | 12.0 | 1.0 | 2.0 | 4.5 | 5.0 | 5.0 | 1.0 | 3.0 | | 1.5 Hf |
| A12 | 53.5 | 1.0 | 10.0 | 12.0 | 1.5 | 2.0 | 4.5 | 5.0 | 5.0 | 1.0 | 3.0 | | 1.5 Hf |

FIG. 1 is a schematic illustration of a portion of a NiZrB phase diagram for a NiZrB system. The portion of the NiZrB phase diagram illustrates the Ni-rich region of the NiZrB system. As illustrated, the NiZrB system at the Ni-rich region exhibits deep eutectics of Ni, with Ni/B and Ni/Zr intermetallic phases. Therefore, due to the deep eutectics in the NiZrB system, Zr can be added to replace some of the B, which is provided for melting-point suppression.

Additionally, for many NiZrB compositions near the liquidus trough of the NiZrB system, thermodynamic stability of $ZrB_2$ promotes a Ni—$ZrB_2$ equilibrium. Thus, for equivalent total B contents, Ni—$ZrB_2$ equilibrium promotes a beneficial and desirable reduction in a volume fraction of Brittle boride phases in the NiZrB composition when used for a repaired region in a Ni-base braze repair alloy composition, as embodied in the invention. The reduction in volume fraction of Brittle boride phases in the repaired regions is a result of Zr bonding with, or "tying up," two (2) boron atoms. This Zr bonding with two boron (B) atoms is contrary to the types of bonds with other elements in a Ni-base braze repair alloy composition, where a boride in equilibrium with Ni is normally in a form of at least one of MB, $M_3B_2$ or $M_3B$, so that a substantially much larger volume fraction of boride are formed for a given boron content.

As discussed above in Ni-base braze repair alloy compositions, a melting range depression is accomplished by the addition of at least Zr and B to Ni-base braze repair alloy composition. Further, strengthening elements, such as but not limited to at least one of Al, W, Mo, Re, Ta and Nb can also be added to the Ni-base braze repair alloy compositions. The resulting Ni-base braze repair alloy composition, as embodied in the invention, provides a useful and desirable melting range for braze repair applications using a Ni-base braze repair alloy composition.

Further, Ni-base braze repair alloy compositions, as embodied in the invention, have small additions of a melting point depressant, such as Si. The total amount of Si is less than the known and conventionally utilized amounts of Si presently used in braze repair alloys, for example those used in powder mixes. Known braze repair alloy powder mixes generally contain too much of a melting point depressant, for example Si to be useful as single-chemistry alloys for repair alloy compositions and applications.

In theory, a Ni-base braze repair alloy composition, for example the "repair alloy goal" as discussed above, possesses a congruent melting material, i.e., a material having a "delta"=0. Further, the Ni-base braze repair alloy composition will possess an incipient melt temperature at temperatures near about 1200° C. (2200° F.). These characteristics provide the Ni-base braze repair alloy composition with an increase in creep rupture life behavior, which shorter creep rupture life may have resulted in known repair alloy compositions from incipient melting effects in Ni-base repair alloy compositions.

Accordingly, with a Ni-base braze repair alloy composition used as a single-chemistry Ni-base braze repair alloy composition, as embodied in the invention, the single-chemistry Ni-base braze repair alloy composition possesses a relatively high solidus temperature and relatively small "delta." In the Ni-base braze repair alloy composition, as embodied in the invention, additions of Zr increase the "delta" and decrease the incipient melting temperature.

Solidus temperatures for most known Ni-base braze repair alloy compositions are relatively low. Therefore, there is a possibility that with use of a known Ni-base alloy composition, a liquid film will be formed at grain boundaries during use. The film may even exist over extended equilibration time periods, and may also be formed at temperatures below the expected use temperature. Therefore, in Ni-base braze repair alloy compositions, as embodied in the invention, an atomic ratio of B:Zr in a Ni-base braze repair alloy conventional composition is generally around about 2:1, while a B:Zr ratio value in the Ni-base braze repair alloy compositions is greater than about 5:1, as embodied by the invention. These ratios produce a larger solidus temperature in the Ni-base braze repair alloy compositions than is desirable.

In Ni-base braze repair alloy compositions, as embodied in the invention, a temperature range over which a liquid film will be formed can be advantageously reduced and the solidus temperature increased, by at least one of partial elimination and reduction of the amount of Zr. Thus, in a Ni-base repair alloy composition, as embodied in the invention, the addition of at least one of Cr and Ti, to achieve at least one of partial elimination and reduction the amount of Zr, thus producing a decrease in liquidus temperatures, which is beneficial.

Selection of constituents of the Ni-base braze repair alloy compositions should provide alloys comprising at least Zr, B, Si, Cr, and Ti. The constituents of the Ni-base braze repair alloy compositions should comprise about 1.5Zr, about 7.5B, about 1.5Si, with Cr levels increased to a range of about 10 to about 14a/o, and Ti of about 5a/o. This selection of constituents for the Ni-base braze repair alloy compositions, as embodied in the invention, reduces liquidus temperatures. Other constituents, such as but not limited to strengtheners, may be added to the above the Ni-base braze repair alloy composition.

As further embodied in the invention, Ni-base braze repair alloy compositions, may take the form of low-melting powders. Thus, the Ni-base braze repair alloy compositions in the form of a low-melting powder comprise low concentrations of melting point depressants, such as B and Si, and also comprise strengtheners, such as but not limited to at least one of Al, Mo, W, Re, Ta, and Nb and avoids the above discussed two-chemistry disadvantages. The concentrations of melting point depressants, such as B and Si, are usually relatively low. The strengtheners, such as but not limited to, at least one of Al, Mo, W, Re, Ta, and Nb provide the Ni-base repair alloy composition with a desirable strengthening content when used for engine component repaired applications.

The Ni-base braze repair alloy composition, as embodied by the invention, comprises at least one of Ti and Cr, to depress melting points of the Ni-base braze repair alloy composition. As embodied in the invention, by mixing low temperature melting powders with high temperature melting powders in a Ni-base braze repair alloy composition, for example a Ni-base braze repair alloy composition comprising relatively low amounts of Cr and Ti, the Ni-base braze repair alloy composition in a repaired region of an engine component will approximate a substrate composition, at least in strength.

Further, a relatively low B and Si content in a Ni-base braze repair alloy composition also allows multiple repairs or applications to be conducted on the engine component. The multiple repairs or applications are due to the advantageous wetting and capillary flow characteristics of the Ni-base braze repair alloy composition over the repair alloy.

Figure 2:
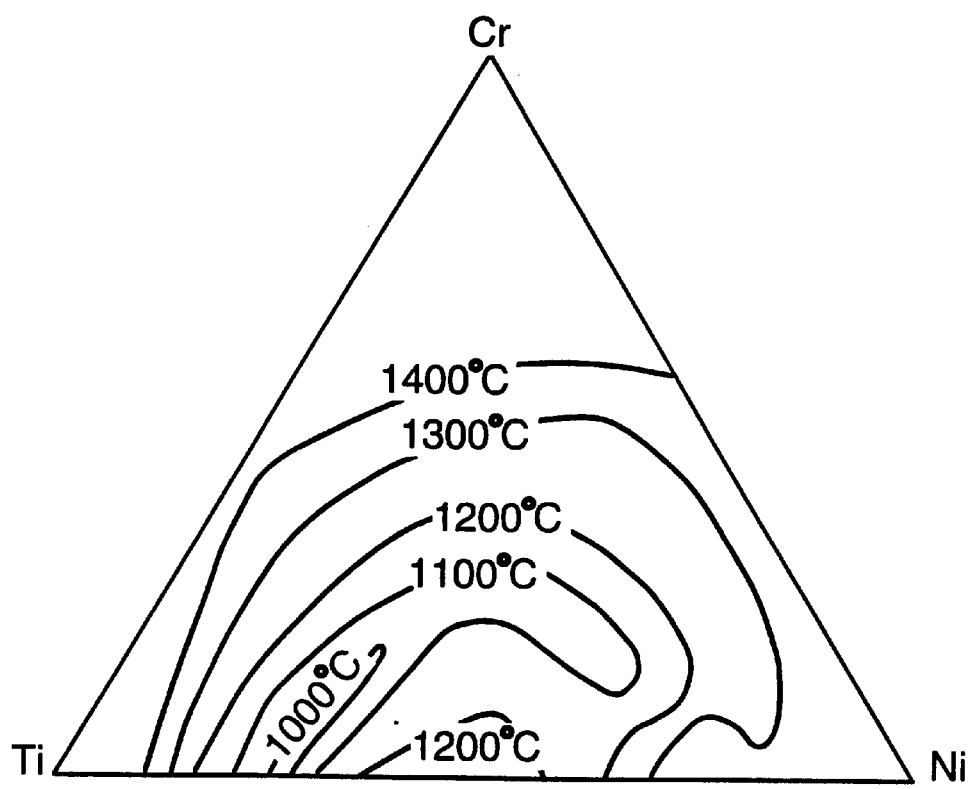
FIG. 2 is a schematic illustration of a NiCrTi phase diagram at a NiCrTi liquidus projection, at the Cr-lean region.

FIG. 2 is a schematic illustration of a NiCrTi phase diagram at a NiCrTi liquidus projection, at the Cr-lean region in a further Ni-base braze repair alloy composition, as embodied in the invention. The Cr-lean region has relatively low melting temperatures because of low temperature eutectics between Ti and $Ni_2Ti$, and also between NiTi and $Ni_3Ti$. Therefore, for a predetermined range of Ni-base braze repair alloy compositions, even substantial Cr concentrations can lead to low melting points, due to the presence of a Ni—Cr eutectic.

Ni-base alloy compositions, as known in the art, rely on Cr and Ti to produce low-melting brazes. Some desirable strengthening elements, such as at least one of Al, Mo, W, Re or Ta, raise a Ni-base braze repair alloy composition's melting ranges. Thus, the addition of appreciable quantities of the strengthening elements, such as but not limited to at least one of Al, Mo, W, Re or Ta, might substantially impact the effectiveness of Ni-base braze repair alloy compositions.

Ni-base braze repair alloy compositions, as discussed above and embodied in the invention, comprise strengthening elements, such as but not limited to at least one of Al, Mo, W, Re or Ta. The Ni-base braze repair alloy composition also comprises small concentrations of melting point depressants, such as B and Si. The relatively small concentrations of melting point depressants, such as B and Si maintain desirably low melting temperature ranges, and provide also beneficial capillary flow and wettability characteristics.

Tables IV and V list further Ni-base braze repair alloy compositions, as embodied in the invention, in terms of atomic percentages and weight percentages, respectively. Table IV also lists estimated temperatures of first melting temperatures and full melting temperatures taken from differential thermal analyses for the Ni-base braze repair alloy compositions. These estimated temperatures are approximate, but provide a satisfactory indication of the trends in liquidus and solidus as a function of temperature for the individual Ni-base braze repair alloy compositions, as embodied in the invention.

As an example, Ni-base braze repair alloy composition A21 as embodied in the invention, but in no way limiting of the invention, a Ni-base braze repair alloy composition comprising Ti, in about 8–13 atomic percent (a/o) in combination with Cr in about 18–27 a/o. These Ni-base braze repair alloy compositions provide a desirable range of melting temperatures for the Ni-base braze repair alloy composition, as embodied in the invention, for an application as a repair alloy composition for an engine component.

Ni-base braze repair alloy compositions, without Zr further provide desirable melting temperature ranges. It is also possible to increase Al content in a Ni-base braze repair alloy composition, for example to about 10 alo, to produce low temperature melting Ni-base braze repair alloy compositions for mixing with higher temperature melting powders.

TABLE IV

Ni-BASE BRAZE REPAIR ALLOY COMPOSITIONS (a/o)

| | | | | | | | | | | | | | Temperatures in ° F. | | |
| Alloy (a/o) | Ni | Ti | Cr | Co | B | Si | Al | Nb | Zr | Ta | Mo | W | Re | solidus | liquidus | delta |
| --- | --- | --- | --- | --- | --- | --- | --- | --- | --- | --- | --- | --- | --- | --- | --- | --- |
| A13 | 35 | 13 | 36.5 | 5 | | | 4 | 1.5 | | 1.5 | 1.5 | 1.5 | 0.5 | 2125 | 2219 | 94 |
| A14 | 31 | 13 | 36.5 | 5 | 2 | 1 | 4 | 1.5 | 1 | 1.5 | 1.5 | 1.5 | 0.5 | 2081 | 2303 | 222 |
| A15 | 34.5 | 13 | 33 | 5 | 2 | 1 | 4 | 1.5 | 1 | 1.5 | 1.5 | 1.5 | 0.5 | 2090 | 2293 | 203 |

TABLE IV-continued

Ni-BASE BRAZE REPAIR ALLOY COMPOSITIONS (a/o)

Temperatures in °F.

| Alloy (a/o) | Ni | Ti | Cr | Co | B | Si | Al | Nb | Zr | Ta | Mo | W | Re | solidus | liquidus | delta |
|---|---|---|---|---|---|---|---|---|---|---|---|---|---|---|---|---|
| A16 | 37.5 | 13 | 30 | 5 | 2 | 1 | 4 | 1.5 | 1 | 1.5 | 1.5 | 1.5 | 0.5 | 2068 | 2172 | 104 |
| A17 | 40.5 | 15 | 25 | 5 | 2 | 1 | 4 | 1.5 | 1 | 1.5 | 1.5 | 1.5 | 0.5 | 2055 | 2221 | 166 |
| A18 | 40.5 | 13 | 27 | 5 | 2 | 1 | 4 | 1.5 | 1 | 1.5 | 1.5 | 1.5 | 0.5 | 2074 | 2179 | 105 |
| A19 | 39.5 | 11 | 30 | 5 | 2 | 1 | 4 | 1.5 | 1 | 1.5 | 1.5 | 1.5 | 0.5 | 2029 | 2169 | 140 |
| A20 | 42.5 | 11 | 27 | 5 | 2 | 1 | 4 | 1.5 | 1 | 1.5 | 1.5 | 1.5 | 0.5 | 2022 | 2181 | 159 |
| A21 | 44 | 11 | 22 | 5 | 2.5 | 1.5 | 7.5 | 1.5 |  | 1.5 | 1.5 | 1.5 | 0.5 | 2082 | 2198 | 116 |
| A22 | 43 | 10 | 24 | 5 | 2 | 1 | 7.5 | 1.5 | 1 | 1.5 | 1.5 | 1.5 | 0.5 | 2017 | 2194 | 177 |
| A23 | 47 | 8 | 22 | 5 | 2 | 1 | 7.5 | 1.5 | 1 | 1.5 | 1.5 | 1.5 | 0.5 | 2020 | 2165 | 145 |
| A24 | 47 | 10 | 20 | 5 | 2 | 1 | 7.5 | 1.5 | 1 | 1.5 | 1.5 | 1.5 | 0.5 | 2017 | 2173 | 156 |
| A25 | 49 | 10 | 18 | 5 | 2 | 1 | 7.5 | 1.5 | 1 | 1.5 | 1.5 | 1.5 | 0.5 | 2019 | 2179 | 156 |
| A26 | 48 | 8 | 22 | 5 | 2 | 1 | 7.5 | 1.5 |  | 1.5 | 1.5 | 1.5 | 0.5 | 2082 | 2208 | 126 |
| A27 | 48 | 10 | 20 | 5 | 2 | 1 | 7.5 | 1.5 |  | 1.5 | 1.5 | 1.5 | 0.5 | 2071 | 2199 | 128 |
| A28 | 50 | 10 | 18 | 5 | 2 | 1 | 7.5 | 1.5 |  | 1.5 | 1.5 | 1.5 | 0.5 | 2074 | 2218 | 144 |
| A29 | 52 | 8 | 18 | 5 | 2 | 1 | 7.5 | 1.5 |  | 1.5 | 1.5 | 1.5 | 0.5 | 2070 | 2236 | 166 |
| A30 | 40 | 28 | 20 | 10 | 1 | 1 |  |  |  |  |  |  |  | na | na | na |
| A31 | 37 | 28 | 20 | 8 | 1 | 1 |  |  |  | 1.5 | 1.5 | 1.5 | 0.5 | na | na | na |
| A32 | 32 | 28 | 20 | 8 | 1 | 1 |  |  |  | 3 | 3 | 3 | 1 | 2027 | 2448 | 421 |

TABLE V

Ni-BASE BRAZE REPAIR ALLOY COMPOSITIONS (w/o)

| Alloy (w/o) | Ni | Ti | Cr | Co | B | Si | Al | Zr | Ta | Mo | W | Re |
|---|---|---|---|---|---|---|---|---|---|---|---|---|
| A13 | 34.82 | 10.55 | 32.16 | 4.99 |  |  | 1.83 | 2.36 Nb | 4.60 | 2.44 | 4.67 | 1.58 |
| A14 | 31.34 | 10.72 | 32.68 | 5.07 | 0.37 | 0.48 | 1.86 | 1.57 + 2.40 Nb | 4.68 | 2.48 | 4.75 | 1.60 |
| A15 | 34.74 | 10.68 | 29.43 | 5.05 | 0.37 | 0.48 | 1.85 | 1.56 + 2.39 Nb | 4.65 | 2.47 | 4.73 | 1.60 |
| A16 | 37.63 | 10.64 | 26.66 | 5.04 | 0.37 | 0.48 | 1.84 | 1.56 + 2.38 Nb | 4.64 | 2.38 | 4.71 | 1.59 |
| A17 | 40.55 | 12.25 | 22.17 | 5.03 | 0.37 | 0.48 | 1.84 | 1.56 + 2.38 Nb | 4.63 | 2.45 | 4.70 | 1.59 |
| A18 | 40.50 | 10.61 | 23.91 | 5.02 | 0.37 | 0.48 | 1.84 | 1.55 + 2.37 Nb | 4.62 | 2.45 | 4.70 | 1.58 |
| A19 | 39.49 | 8.97 | 26.56 | 5.02 | 0.37 | 0.48 | 1.84 | 1.55 + 2.37 Nb | 4.62 | 2.45 | 4.70 | 1.58 |
| A20 | 42.34 | 8.94 | 23.82 | 5.00 | 0.37 | 0.48 | 1.83 | 1.55 + 2.36 Nb | 4.61 | 2.44 | 4.68 | 1.58 |
| A21 | 44.97 | 9.17 | 19.92 | 5.13 | 0.47 | 0.73 | 3.52 | 2.43 Nb | 4.73 | 2.51 | 4.80 | 1.62 |
| A22 | 43.43 | 8.24 | 21.47 | 5.07 | 0.37 | 0.48 | 3.48 | 1.57 + 2.40 Nb | 4.67 | 2.48 | 4.74 | 1.60 |
| A23 | 47.18 | 6.55 | 19.56 | 5.04 | .37 | .48 | 3.46 | 1.56 + 2.38 Nb | 4.65 | 2.46 | 4.72 | 1.59 |
| A24 | 47.25 | 8.20 | 17.81 | 5.05 | .37 | .48 | 3.47 | 1.56 + 2.39 Nb | 4.65 | 2.46 | 4.72 | 1.59 |
| A25 | 49.15 | 8.18 | 15.99 | 5.03 | .37 | .48 | 3.46 | 1.56 + 2.38 Nb | 4.64 | 2.46 | 4.71 | 1.59 |
| A26 | 48.46 | 6.59 | 19.67 | 5.07 | .37 | .48 | 3.48 | 2.40 Nb | 4.67 | 2.47 | 4.74 | 1.60 |
| A27 | 48.53 | 8.25 | 17.91 | 5.07 | .37 | .48 | 3.48 | 2.40 Nb | 4.67 | 2.48 | 4.75 | 1.61 |
| A28 | 50.43 | 8.23 | 16.08 | 5.06 | .37 | .48 | 3.48 | 2.39 Nb | 4.66 | 2.47 | 4.75 | 1.60 |
| A29 | 52.26 | 6.56 | 16.02 | 5.04 | .37 | .48 | 3.46 | 2.39 Nb | 4.65 | 2.46 | 4.72 | 1.59 |
| A30 | 43.83 | 25.04 | 19.41 | 11.00 | .20 | .52 |  |  |  |  |  |  |
| A31 | 37.16 | 22.93 | 17.78 | 8.06 | .18 | .48 |  |  | 4.64 | 2.46 | 4.72 | 1.59 |
| A32 | 29.64 | 21.16 | 16.41 | 7.44 | .17 | .44 |  |  | 8.56 | 4.54 | 8.70 | 2.94 |

While the embodiments described herein are disclosed, it will be appreciated from the specification that various combinations of elements, variations or improvements therein may be made by those skilled in the art that are within the scope of the invention.

What is claimed is:

1. A Ni-base alloy composition comprising:
   Zr;
   B; and
   and balance Ni,
   wherein Zr and B are coupled to each other to form $ZrB_2$, and B and Zr suppress melting points of the Ni-base alloy composition.

2. A composition according to claim 1, further comprising at least one further melting point suppressant.

3. A composition according to claim 2, wherein the further melting point suppressant comprises of at least Si.

4. A composition according to claim 1, further comprising at least one strengthener.

5. A composition according to claim 4, the strengthener comprising at least one strengthener selected from the group consisting of:

Al, W, Mo, Re, Ta, and Nb.

6. The composition of claim 5, herein the strengthener comprising at least one strengthener selected from the group consisting of:

Al, W, Mo, Re, Ta, and Nb, where Al is in a range of about 4.0–15.0 atomic percent; W is in a range up to about 3.0 atomic percent, Mo is in a range up to about 3.0 atomic percent, Re is in a range of about 0.2 to about 1.5 atomic percent, Ta is in a range of up to about 3.0 atomic percents and Nb is in a range of about 0.2 to about 2.5 atomic percent.

7. A composition according to claim 1, wherein a ratio of B:Zr is in a range of about 2:1 to about 5:1.

8. A composition according to claim 7, wherein the ratio of B:Zr is about 2:1.

9. A composition according to claim 7, wherein Zr is in a range of about 1.0 to about 4.0 atomic percent and B is in a range of about 3.0 to about 8.0 atomic percent.

10. A composition according to claim 7, further comprising of at least one constituent selected from the group consisting of:

Cr, Co, and Al.

11. A composition according to claim 1, further comprising:

Cr, Co, and Al.

12. A composition according to claim 10, wherein Cr is in a range of about 4.0 to about 12.0 atomic percent; Co is in a range of about 4.0 to about 12.0 atomic percent; and Al is in a range of about 5.0 to about 15.0 atomic percent.

13. A composition according to claim 1, further comprising Hf.

14. A composition according to claim 1, further comprising Ti, wherein Ti is in a range up to about 3.0 atomic percent.

15. The composition according to claim 3, wherein Si is present in the range of about 0.5 atomic percent to about 3.0 atomic percent.

* * * * *